US009148861B1

(12) United States Patent
Vargantwar et al.

(10) Patent No.: US 9,148,861 B1
(45) Date of Patent: Sep. 29, 2015

(54) OFFSET TO DATA RATE CONTROL BASED ON TRANSMISSION POWER IN NEIGHBOR SECTOR

(75) Inventors: Sachin R. Vargantwar, Macon, GA (US); Jasinder P. Singh, Olathe, KS (US); Deveshkumar Rai, Overland Park, KS (US); Maulik K. Shah, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 358 days.

(21) Appl. No.: 13/558,145

(22) Filed: Jul. 25, 2012

(51) Int. Cl.
| | |
|---|---|
| *H04W 52/60* | (2009.01) |
| *H04W 40/08* | (2009.01) |
| *H04W 52/26* | (2009.01) |
| *H04W 28/22* | (2009.01) |
| *H04B 7/26* | (2006.01) |

(52) U.S. Cl.
CPC .............. *H04W 52/60* (2013.01); *H04W 28/22* (2013.01); *H04W 40/08* (2013.01); *H04B 7/264* (2013.01); *H04B 7/2659* (2013.01); *H04W 52/26* (2013.01)

(58) Field of Classification Search
CPC ..... H04B 7/264; H04B 7/2659; H04W 28/22; H04W 52/60; H04W 40/08; H04W 52/26; H04L 47/14; H04L 47/29; H04L 47/25
See application file for complete search history.

(56) References Cited

U.S. PATENT DOCUMENTS

| | | | |
|---|---|---|---|
| 6,285,861 B1 | 9/2001 | Bonaccorso et al. | |
| 6,738,373 B2 | 5/2004 | Turner | |
| 7,072,661 B2 | 7/2006 | Vitebsky | |
| 7,457,641 B1 | 11/2008 | Legnain et al. | |
| 7,916,715 B2 | 3/2011 | Rezaiifar et al. | |
| 7,945,281 B1* | 5/2011 | Sigg et al. ...................... | 455/522 |
| 8,346,250 B1 | 1/2013 | Sarkar et al. | |
| 8,369,297 B1* | 2/2013 | Vargantwar .................... | 370/338 |
| 2006/0274702 A1* | 12/2006 | Li et al. ........................ | 370/338 |
| 2007/0133476 A1 | 6/2007 | Li et al. | |
| 2008/0013488 A1 | 1/2008 | Garg et al. | |
| 2009/0163238 A1* | 6/2009 | Rao et al. ...................... | 455/522 |
| 2011/0176448 A1 | 7/2011 | Rezaiifar et al. | |
| 2013/0203430 A1* | 8/2013 | Gan et al. ...................... | 455/522 |

OTHER PUBLICATIONS

Svedman et al., "A QoS-aware Porportional Fair Scheduler for Opportunistic OFDM," Jul. 5, 2004, 2006 IEEEE.
Office Action in U.S. Appl. No. 12/368,323 mailed Sep. 30, 2011.
(Continued)

*Primary Examiner* — Yee Lam

(57) ABSTRACT

Methods and systems are disclosed that may help a base station to adjust forward-link data rates in a given sector based on transmission-power variations in neighboring sectors. An exemplary method involves a base station that serves a first sector: (a) determining a respective transmission power for each of two or more channels of a second sector, (b) detecting a transmission-power difference between at least two of the channels of the second sector, and (c) in response to detecting the transmission-power difference: (i) determining a data rate control (DRC) adjustment for the first sector based at least in part on the transmission-power difference; and using the determined DRC adjustment to determine a forward-link data rate for at least one access terminal in the first sector.

17 Claims, 7 Drawing Sheets

(56) References Cited

OTHER PUBLICATIONS

Unpublished U.S. Appl. No. 12/368,323, entitled "Enhanced Simultaneous Hybrid Dual Receive Switching" filed Feb. 10, 2009 in the name of Debasish Sarkar et al.

Unpublished U.S. Appl. No. 12/886,232, entitled "Method and System for Prioritizing Time-Division Multiplexed Communications Resources at a Femtocell" filed Sep. 20, 2010 in the name of Muralidhar Malreddy et al.

* cited by examiner

OFFSET TO DATA RATE CONTROL BASED ON TRANSMISSION POWER IN NEIGHBOR SECTOR

RELATED APPLICATION

This application claims priority to U.S. application Ser. No. 13/110,043 filed on May 18, 2011, entitled "Specification of Forward-Link Rate Control Based on Neighbor Load," the contents of which are incorporated by reference herein for all purposes.

BACKGROUND

In a typical cellular radio communication system (wireless communication system), an area is divided geographically into a number of cell sites, each defined by a radio frequency (RF) radiation pattern from a respective base transceiver station (BTS) antenna. The base station antennas in the cells are in turn coupled to a base station controller (BSC), which is then coupled to a telecommunications switch or gateway, such as a mobile switching center (MSC) and/or a packet data serving node (PDSN) for instance. The switch or gateway may then be coupled with a transport network, such as the PSTN or a packet-switched network (e.g., the Internet).

When an access terminal (such as a cellular telephone, pager, or appropriately equipped portable computer, for instance) is positioned in a cell, the access terminal (also referred to herein by "AT") communicates via an RF air interface with the BTS antenna of the cell. Consequently, a communication path is established between the AT and the transport network, via the air interface, the BTS, the BSC and the switch or gateway. Functioning collectively to provide wireless (i.e., RF) access to services and transport in the wireless communication system, the BTS, BSC, MSC, and PDSN, comprise (possibly with additional components) what is typically referred as a Radio Access Network (RAN).

As the demand for wireless communications has grown, the volume of call traffic in most cell sites has correspondingly increased. To help manage the call traffic, most cells in a wireless network are usually further divided geographically into a number of sectors, each defined respectively by radiation patterns from directional antenna components of the respective BTS, or by respective BTS antennas. These sectors can be referred to as "physical sectors," since they are physical areas of a cell site. Therefore, at any given instant, an access terminal in a wireless network will typically be positioned in a given physical sector and will be able to communicate with the transport network via the BTS serving that physical sector.

As an access terminal moves between wireless coverage areas of a wireless communication system, such as between cells or sectors, or when network conditions change or for other reasons, the AT may "hand off" from operating in one coverage area to operating in another coverage area. In a usual case, this handoff process is triggered by the access terminal monitoring the signal strength of various nearby available coverage areas, and the access terminal or the BSC (or other controlling network entity) determining when one or more threshold criteria are met. For instance, the AT may continuously monitor signal strength from various available sectors and notify the BSC when a given sector has a signal strength that is sufficiently higher than the sector in which the AT is currently operating. The BSC may then direct the AT to hand off to that other sector.

An access terminal may also engage in an active communication session simultaneously with multiple cells or sectors that are located geographically nearby one another, and which are all detected by the AT above one or another threshold signal strength. In this mode of operation, the AT is said to be in "soft handoff" with the multiple sectors, and may move among them seamlessly with respect to the active communication session. As the AT moves beyond the threshold range of one or another of its soft handoff sectors and into the range of one or more other sectors, usual handoff procedures are used to update the particular sectors with which the AT is in soft handoff.

In some wireless communication systems or markets, a wireless service provider may implement more than one type of air interface protocol. For example, a carrier may support one or another version of CDMA, such as EIA/TIA/IS-2000 Rel. 0, A (hereafter "IS-2000") for both circuit-cellular voice and data traffic, as well as a more exclusively packet-data-oriented protocol such as EIA/TIA/IS-856 Rel. 0 and Rev. A, or other version thereof (hereafter "IS-856" unless otherwise specified). Access terminals operating in such systems may be capable of communication with either or both protocols, and may further be capable of handing off between them, in addition to being able to hand off between various configurations of coverage areas.

OVERVIEW

An access terminal (AT) receives data from a base station (or sector or a BTS) on a "forward link" and sends data to the base station on a "reverse link." Data on either link are encoded and transmitted by the sender and received and decoded by the receiver. For packet-data communications, the encoded data is assembled into packets which are then transmitted. The rate at which a given amount of packet data is transmitted (i.e., the "data rate") corresponds the "density" of data in each packet, and is governed largely by the scheme used to encode the data. The data rate that can be reliably achieved on a link depends on the ability of the receiver to successfully decode the received encoded data, which in turn depends, at least in part, on the RF conditions between the transmitting and receiving entities on that link.

RF conditions are typically measured as some form of signal-to-noise ratio ("SNR"). Generally, the higher the SNR, the higher the achievable data rate, and vice versa. The signal power level (the numerator in the SNR) measured by a receiving entity (e.g., the AT for the forward link) depends on the transmission power level of the transmitting entity and on the distance between the transmitting and receiving entities, among other possible factors. The noise (the denominator in the SNR) depends on other transmitting sources, such as neighboring base stations, and reflections of signals off buildings and other structures, for example. By adjusting the encoding scheme according to the SNR at any given time, the data transmission rate can thus be optimized for the prevailing RF conditions.

In particular, under IS-856 an access terminal periodically measures the SNR of its forward link from its "serving" base station, and then informs the serving base station of a requested data rate. For example, the access terminal may determine a Data Rate Control (DRC) code which indicates a requested forward-link data rate. The DRC code may be determined based on a measure of SNR such as Carrier-to-Interference (C/I) or to Signal to Interference plus Noise (SINR). The DRC code may then be transmitted to the access terminal's serving sector in a DRC request message.

The serving base station may then use the DRC code to determine the forward-link data rate to use for data transmissions to the access terminal. The serving base station could simply use the forward-link data rate that corresponds to the DRC code indicated by an access terminal. However, under IS-856, the serving base station can, for various reasons, apply a DRC offset, which adjusts the forward-link data rate from that which corresponds to the received DRC code. In an example embodiment, the serving base station may apply a DRC offset in order to help compensate for a possible over-estimation by the AT of its attainable forward-link data rate.

In particular, the forward link may include data traffic channels, as well as a Medium Access Control (MAC) channel and a pilot channel. Thus, under IS-856, a forward-link slot may include a data portion, as well as pilot portion and a MAC portion. When there is no loading on a sector carrier (e.g., when no there is no data being transmitted via the traffic channels), the serving based station will reduce the transmission power used for data portion of forward-link slots so as to reduce interference to carriers in neighboring sectors. However, at the same time, the transmission power for the pilot and/or MAC portions may not be reduced. As a result, an access terminal in a neighboring sector may overestimate, e.g., C/I or SINR, and therefore provide an artificially high DRC request in the neighboring sector.

More specifically, when a given sector A reduces the power of its data transmissions, but does not make a corresponding reduction to the power of pilot and/or MAC transmissions, an access terminal in the neighboring sector B may determine C/I or SINR during the data portion of a slot in sector A. Since the average transmission power in sector A is greater than the transmission power for the data portion, the access terminal in the neighboring sector B may under-estimate the amount of interference from sector A, and in turn, may over-estimate the data rate it can request. Accordingly, when a base station serving a given sector determines that a neighboring sector has variable transmission power, the base station may apply a DRC offset to DRC requests in the given sector, to compensate for possible over-estimation of the data rate by an access terminal.

In one aspect, an exemplary method involves: (a) a base station that serves a first sector determining a respective transmission power for each of two or more channels of a second sector; (b) detecting a transmission-power difference between at least two of the channels of the second sector; and (c) in response to detecting the transmission-power difference: (i) determining a data rate control (DRC) adjustment for the first sector based at least in part on the transmission-power difference; and (ii) based at least in part on the determined DRC adjustment, determining a forward-link data rate for at least one access terminal in the first sector.

In another aspect, a non-transitory computer readable medium has stored therein instructions that are executable to cause a base station to perform functions comprising: (a) detecting a transmission-power difference between at least two of the channels of the second sector; and (b) in response to detecting the transmission-power difference: (i) determining a data rate control (DRC) adjustment for the first sector based at least in part on the transmission-power difference; and (ii) using the determined DRC adjustment as a basis for determining a forward-link data rate for at least one access terminal in the first sector.

In a further aspect, another exemplary method involves: (a) a base station that serves a second sector determining that there is a transmission-power difference between two or more channels of the second sector; and (b) in response to detecting the transmission-power difference, the second base station initiating a data-rate adjustment process in an effort to cause a data rate control (DRC) adjustment in a first sector, wherein the DRC adjustment is based at least in part on the transmission-power difference between two or more channels of the second sector.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible. For instance, structural elements and process steps can be rearranged, combined, distributed, eliminated, or otherwise changed, while remaining within the scope of the invention as claimed.

DETAILED DESCRIPTION

Exemplary methods and systems are described herein. It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described herein are not meant to be limiting. It will be readily understood that certain aspects of the disclosed systems and methods can be arranged and combined in a wide variety of different configurations, all of which are contemplated herein.

Exemplary embodiments may be described herein by way of example with reference to Code Division Multiple Access ("CDMA") communications in general, and to IS-2000 and IS-856 communications in particular. As described below, IS-2000 applies to both circuit-cellular and packet-data communications, and is referred to herein simply as CDMA communications. IS-856 applies more exclusively to packet-data communications (including, e.g., real-time voice and data applications), and is referred to herein as "high rate" packet-data communications. Under IS-2000, packet-data communications are referred to as "1X-RTT" communications, also abbreviated as just "1x." However, since IS-2000 supports both circuit voice and packet data communications, the term 1X (or 1X-RTT) is sometimes used to more generally refer the IS-2000 air interface, without regard to the particular type of communication carried. Packet-data communications under IS-856 are conventionally referred to as "EVDO" communications, also abbreviated as just "DO." The terms EVDO, Rel. 0 and EVDO, Rev. A will be used herein to refer to IS-856, Rel. 0 and IS-856, Rev. A, respectively, and vice versa. Different versions of 1X-RTT may be similarly distinguished. Absent any specific version identification, EVDO will generally refer to any version of IS-856, and vice versa. It should be understood that the present invention can apply to other wireless voice and data protocols including, without limitation, IS-95, UMTS, LTE, WiFi, WiMax, and GSM, which, together with IS-2000 and IS-856 are considered herein, individually or in any combination, to comprise a CDMA family of protocols.

Further, for most purposes of the discussion herein, a wireless coverage area in a radio access network (RAN) may be considered simply to be a cell or a sector, at least in connection with access or service provided to (or potentially provided to) an access terminal. It will be appreciated, however, that there could be distinguishing characteristics between a wireless coverage area, a cell, and a sector.

I. Exemplary Communication Systems

Figure 1:
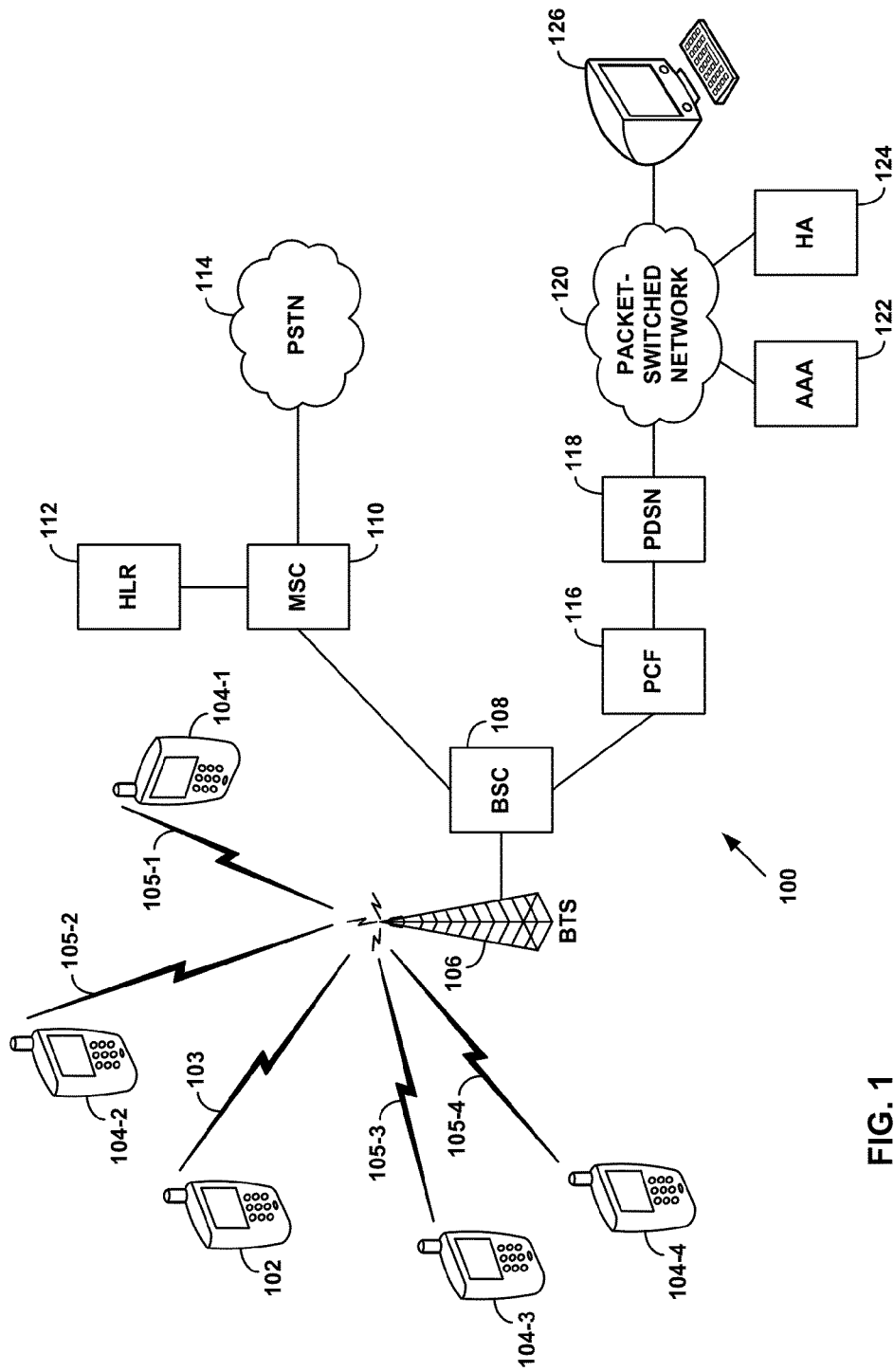
FIG. 1 is a simplified block diagram of a wireless communication system in which an exemplary embodiment may be implemented.

FIG. 1 shows a simplified block diagram of a wireless communication system 100 in which an example embodiment may be implemented. Access terminal (AT) 102 communicates over an air interface 103 with a BTS 106, which is then coupled or integrated with a BSC 108. Transmissions over air interface 103 from BTS 106 to AT 102 represent the forward link to the access terminal. Transmissions over interface 103 from AT 102 to BTS 106 represent the reverse link. Four other access terminals, AT 104-1, 104-2, 104-3, and 304-4, are also depicted in FIG. 1. As indicated, they communicate with BTS 106 over air interfaces 105-1, 105-2, 105-3, and 105-4, respectively. Each of these air interfaces is operationally similar to air interface 103, each representing at least a forward and reverse link. It will be appreciated that the particular arrangement shown is for purposes of illustration.

BSC 108 is connected to MSC 110, which acts to control assignment of air traffic channels (e.g., over air interface 103, 105-1, 105-2, 105-3, and 105-4), and provides access to wireless circuit-switched services such as circuit-voice and circuit-data (e.g., modem-based packet data) service. As represented by its connection to PSTN 114, MSC 110 is also coupled with one or more other MSCs or other telephony circuit switches in the operator's (or in a different operator's) network, thereby supporting user mobility across MSC regions, and local and long-distance landline telephone services. Also connected to MSC 110 is home location register (HLR) 112, which supports mobility-related aspects of subscriber services, including dynamic tracking of subscriber registration location and verification of service privileges.

As shown, BSC 108 is also connected with a PDSN 118 by way of packet control function (PCF) 116. PDSN 118 in turn provides connectivity with a packet-switched network 120, such as the Internet and/or a wireless carrier's private core packet-network. Sitting as nodes on network 120 are, by way of example, an authentication, authorization, and accounting (AAA) server 122, a mobile-IP home agent (HA) 124, and a remote computer 126. After acquiring an air traffic channel over its air interface, an access terminal (e.g., AT 102) may send a request to PDSN 118 for a connection in the packet data network. Then, following authentication of the access terminal by AAA server 120, the access terminal may be assigned an IP address by the PDSN or by HA 124, and may thereafter engage in packet-data communications with entities such as remote computer 126.

It should be understood that the depiction of just one of each network element in FIG. 1 is illustrative, and there could be more than one of any of them, as well as other types of elements not shown. The particular arrangement shown in FIG. 1 should not be viewed as limiting with respect to the present invention. Further, the network components that make up a wireless communication system such as system 100 are typically implemented as a combination of one or more integrated and/or distributed platforms, each comprising one or more computer processors, one or more forms of computer-readable storage (e.g., disks drives, random access memory, etc.), one or more communication interfaces for interconnection between elements and the network, and operable to transmit and receive the communications and messages described herein, and one or more computer software programs and related data (e.g., machine-language instructions and program and user data) stored in the one or more forms of computer-readable storage and executable by the one or more computer processors to carry out the functions, steps, and procedures of the various embodiments of the present invention described herein. Similarly, a communication device such as example access terminals 102, 104-1, 104-2, 104-3, and 104-4 typically comprises a user-interface, I/O components, a communication interface, a tone detector, a processing unit, and data storage, all of which may be coupled together by a system bus or other mechanism. As such, system 100, ATs 102, 104-1, 104-2, 104-3, and 104-4, and air interfaces 103, 105-1, 105-2, 105-3, and 105-4 collectively are representative of example means of implementing and carrying out the various functions, steps, and procedures described herein.

Figure 2:
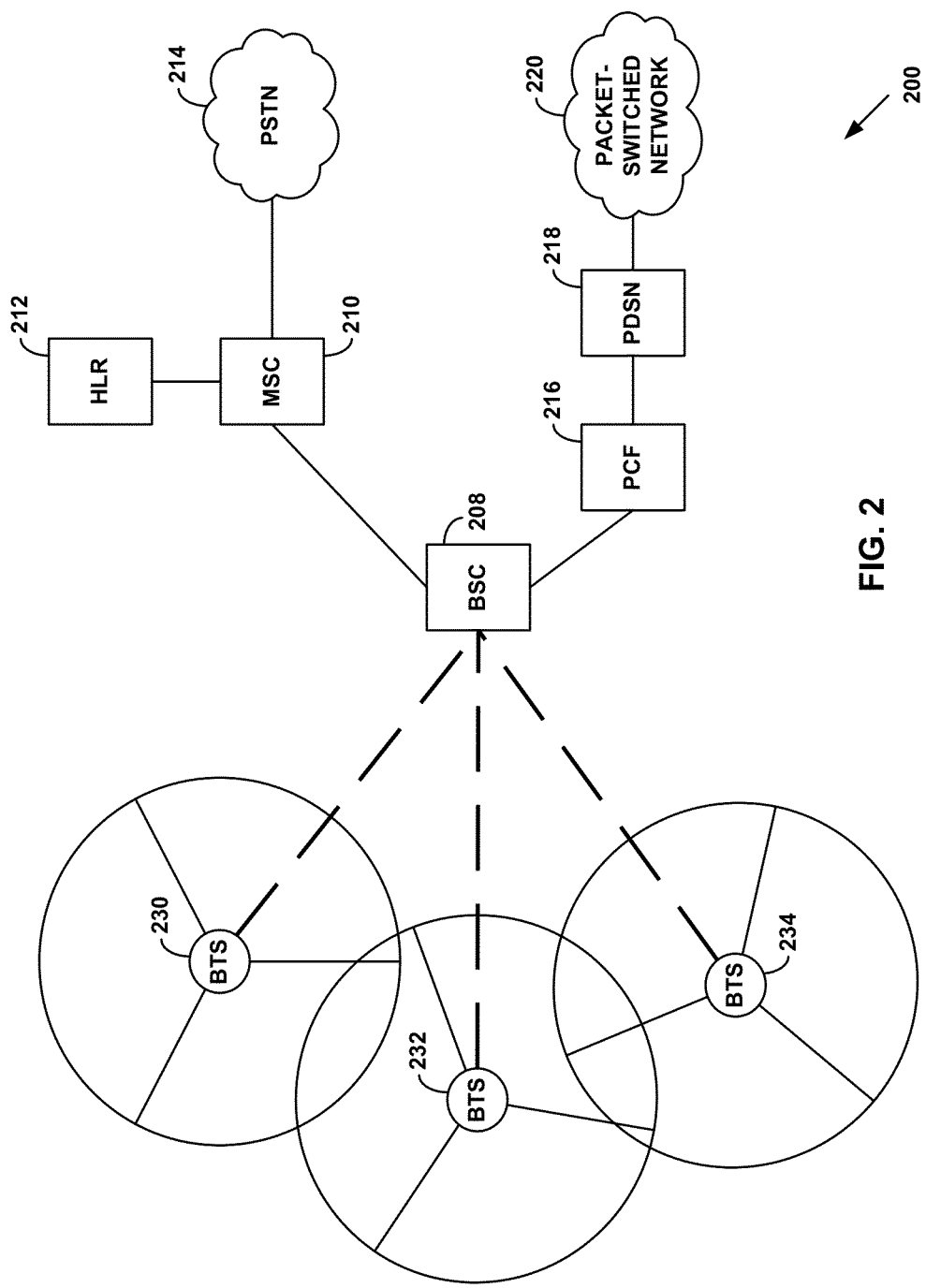
FIG. 2 is a simplified block diagram illustrating a wireless communication system in which a base station serves multiple sectors, according to an exemplary embodiment.

In practice, a BSC may serve multiple BTSs, each of which may then radiate to define a given cell and a plurality of cell sectors. FIG. 2 is a block diagram illustrating a wireless communication in which a base station serves multiple sectors, according to an exemplary embodiment. More specifically, FIG. 2 shows BSC 208 in network 200 coupled with three BTSs 230, 232, and 234 (for the sake of brevity, access terminals, the AAA server, and the HA are omitted from this figure). Each BTS is shown at the core of a respective circle representing a cell, and each cell is divided into three pie-pieces representing sectors. With this arrangement, an access terminal can operate in any of the sectors and can connect, via a serving BTS, with MSC 210 for circuit-based services in the wireless communication system and beyond (e.g., in PSTN 214). Through its serving sector, an access terminal can also communicate, via PCF 216 and PDSN 218, on packet network 220. Note that the depiction of three wireless services sectors for each of the BTSs in FIG. 2 is illustrative, and other numbers of sectors per BTS are possible. Further, the relative positions of the BTSs and the relative angular orientations of the sectors are also illustrative, and other arrangements may be used.

Throughout this description, the term "base station" will be used to refer to a Radio Access Network (RAN) element such as a BTS, a BSC, or combination BTS/BSC, for instance. The term "radio network controller" (RNC) can also be used to refer to a BSC, or more generally to a base station. In some arrangements, two or more RNCs may be grouped together, wherein one of them carries out certain control functions of the group, such as coordinating handoffs across BTSs of the respective RNCs in the group. The term controlling RNC (or C-RNC) customarily applies to the RNC that carries out these (and possibly other) control functions.

A. IS-2000 Communications

In a CDMA wireless network compliant with the IS-2000 standard, each cell employs one or more carrier frequencies, typically 1.25 MHz in bandwidth each, and each wireless service sector is distinguished from adjacent sectors by a pseudo-random number offset ("PN offset"). Further, each sector can concurrently communicate on multiple different channels, distinguished from each other by "Walsh codes." When an access terminal operates in a given sector, communications between the access terminal and the BTS of the sector are carried on a given frequency and are encoded by the sector's PN offset and a given Walsh code.

Air interface communications are divided into forward-link communications, which are those passing from the base station to the access terminal, and reverse-link communications, which are those passing from the access terminal to the base station. In an IS-2000 system, data are transmitted in units of frames on both the forward link and reverse link. On either link, communications in a given wireless service sector are encoded with the sector's PN offset and a given Walsh code. On the forward link, certain Walsh codes are reserved for use to define control channels, including a pilot channel, a sync channel, and one or more paging channels, and the remainder can be assigned dynamically for use as traffic channels, i.e., to carry user communications. Similarly, on the reverse link, one or more Walsh codes may be reserved to define access channels, and the remainder can be assigned dynamically for use as traffic channels.

Concurrent communication in multiple forward-link channels on a common frequency in a sector is supported by allocating each channel a fraction of the total forward-link power available in the sector. The power allocated to each channel may be determined in an effort to optimize the signal-to-noise characteristics of all the channels, and may vary with time according to the number of access terminals being serviced and/or their relative positions with respect to the BTS, among other factors. Similarly, on the reverse links, each access terminal may transmit at a power level that seeks to optimize signal-to-noise ratio while also attempting to minimize interference with other access terminals.

With the arrangement described above, an access terminal can engage in cellular voice and/or in packet-data communications. Referring again to FIG. 1, and taking an originating call from AT 102 as an example, AT 102 first sends an origination request over air interface 103 and via the BTS 106 and BSC 108 to MSC 110. The MSC then signals back to the BSC directing the BSC to assign an air interface traffic channel for use by the access terminal. For a voice call, the MSC uses well-known circuit protocols to signal call setup and establish a circuit connection to a destination switch that can then connect the call to a called device (e.g., landline phone or another access terminal). For a packet-data session (i.e., 1X-RTT), the BSC signals to the PDSN 118 by way of PCF 116. The PDSN 118 and access terminal 102 then negotiate to establish a data link layer connection, such as a point to point protocol (PPP) session. Further, the PDSN 118 sends a foreign agent advertisement that includes a challenge value to the access terminal, and the access terminal responds with a mobile-IP registration request (MIP RRQ), including a response to the challenge, which the PDSN forwards to HA 124. The HA then assigns an IP address for the access terminal to use, and the PDSN passes that IP address via the BSC to the access terminal.

B. IS-856 Packet-Data Communications

Under IS-2000, the highest rate of packet-data communications theoretically available on a fundamental traffic channel of the forward link is 9.6 kbps, dependent in part on the power allocated to the forward-link traffic channel and the resultant signal-to-noise characteristics. In order to provide higher rate packet-data service to support higher bandwidth applications, the industry introduced a new "high rate packet data (HRPD) system," which is defined by industry standard IS-856.

IS-856 leverages the asymmetric characteristics of most IP traffic, in which the forward link typically carries a higher load than the reverse link. Under IS-856, each access terminal maintains and manages an active set and a neighbor list as described above, but receives forward-link transmission from only one active sector at a time. In turn, each sector transmits to all its active ATs on a common forward link using time division multiplexing (TDM) in order to transmit to only one access terminal at a time, but at the full power of the sector. As a result of the full-power allocation by the sector, an access terminal operating under IS-856 can, in theory, receive packet-data at a rate of at least 38.4 kbps and up to 2.4 Mbps on its forward link.

TDM access on the IS-856 forward link is achieved by dividing the forward link in the time domain into timeslots of length 2048 chips each. At a chip rate of 1.228 Mega-chips per second, each slot has a duration of 1.67 milliseconds (ms), or a rate of 600 timeslots per second. Every 16 slots comprise a frame, corresponding to 26.67 ms per frame, and frame boundaries are synchronous across all sectors of a RAN.

Each timeslot is further divided into two 1024-chip half-slots, each half-slot arranged to carry a 96-chip pilot burst (pilot channel) at its center and a Medium Access Control (MAC) channel in two 64-chip segments, one on each side of the pilot burst, for 256 MAC-channel chips per slot. The MAC channel is further subdivided into a Reverse Activity sub-channel, a "data rate control" (DRC) Lock sub-channel, an ARQ sub-channel, and a reverse power control (RPC) sub-channel. The remaining 1600 chips of each timeslot (800 per half-slot) are allocated for a forward traffic channel or a forward control channel, so that any given timeslot will carry either AT-specific traffic-channel data (if any exists) or AT-specific control-channel data. While the 1600 chips of forward-link traffic and/or control channel data of any given timeslot are designated on a TDM basis to a specific access terminal, the MAC channel chips are encoded using different Walsh codes in order to broadcast different MAC sub-channels concurrently over the same MAC-channel chips and/or to transmit different AT-specific MAC-sub-channel data concurrently to different ATs on the same MAC-channel chips. As in IS-2000, each sector in IS-856 is defined by a PN offset, and the pilot channel carries an indication of the sector's PN offset.

The reverse link under IS-856 retains largely the traditional IS-2000 code division multiplexing (CDM) format, albeit with the addition of a "data rate control" (DRC) channel used to indicate the supportable data rate and best serving sector for the forward link. More specifically, in maintaining its active set, the AT continually monitors the pilot signal from each sector in its active set to determine which has the best RF conditions on its forward link. The quality of the RF conditions on a forward link is measured in terms of SINR (or a similar metric), and the selected sector is designated the AT's "serving sector." In conventional operation, the AT determines the supportable data rate on the forward link by using the measured SINR of its serving sector to select one of several pre-determined data rates in a look-up table stored in the AT's memory, for instance. The AT then transmits a request for the selected data rate in a DRC message on the AT's reverse-link DRC sub-channel to its serving sector.

To acquire packet data connectivity under IS-856, after an AT first detects an EVDO carrier, the access terminal sends to its BSC (or RNC) 108 a UATI (Universal Access Terminal Identifier) request, and receives in response an UATI, which the access terminal can then use to identify itself in subsequent communications with the BSC. The access terminal then sends a connection-request to the BSC 108, and the BSC responsively invokes a process to authenticate the access terminal and to have the access terminal acquire a data link.

In particular, the BSC 108 sends an access request to an Access Network AAA (ANAAA) server (which may be different than the AAA server 122), and the ANAAA server authenticates the access terminal. The BSC 108 then assigns radio resources for the data session, providing a MAC identifier ("MAC ID") to the AT for identifying its time-slot data sent in the forward-link traffic channel, and a Walsh code for a sending data on the reverse-link traffic channel. Further, the BSC signals to the PDSN 118 (via PCF 116), and the PDSN and access terminal then negotiate to establish a PPP data link. In addition, as in the IS-2000 process, the access terminal then sends an MIP RRQ to the PDSN, which the PDSN forwards to the HA 124, and the HA assigns a mobile-IP address for the access terminal to use.

In an EVDO communication session (i.e., under IS-856), user data are transmitted to an AT on the forward link using a TDM scheme, as described above. User data may be first encoded into data packets, and the packets are transmitted during specific timeslots allocated for transmissions to that AT. The AT recovers the user data by decoding each time-slot transmission it receives on its forward link from the base station. Since each timeslot is of equal duration (e.g., 1.67 ms under IS-856), the forward-link data rate may depend on the amount or the density of data that are transmitted during each timeslot, which in turn is determined by the particular encoding scheme used. Hence, different forward-link data rates are achieved by using different encoding schemes, and thus the number of timeslots required to transmit a given encoded data packet depends on the encoding scheme used to generate the given data packet.

As described above, under IS-856 a base station (or sector) broadcasts two pilot bursts and a MAC channel during every timeslot, as well as any encoded data awaiting transmission. However, the base station may not at every instant have user data to transmit. Consequently, at various times some number of a base station's timeslot transmissions may be empty with respect to encoded user data. A timeslot corresponding to a transmission containing no encoded packet data is referred to an "idle" timeslot. Conversely, a non-idle timeslot is one during which a transmission does contain encoded packet data.

Figure 3:
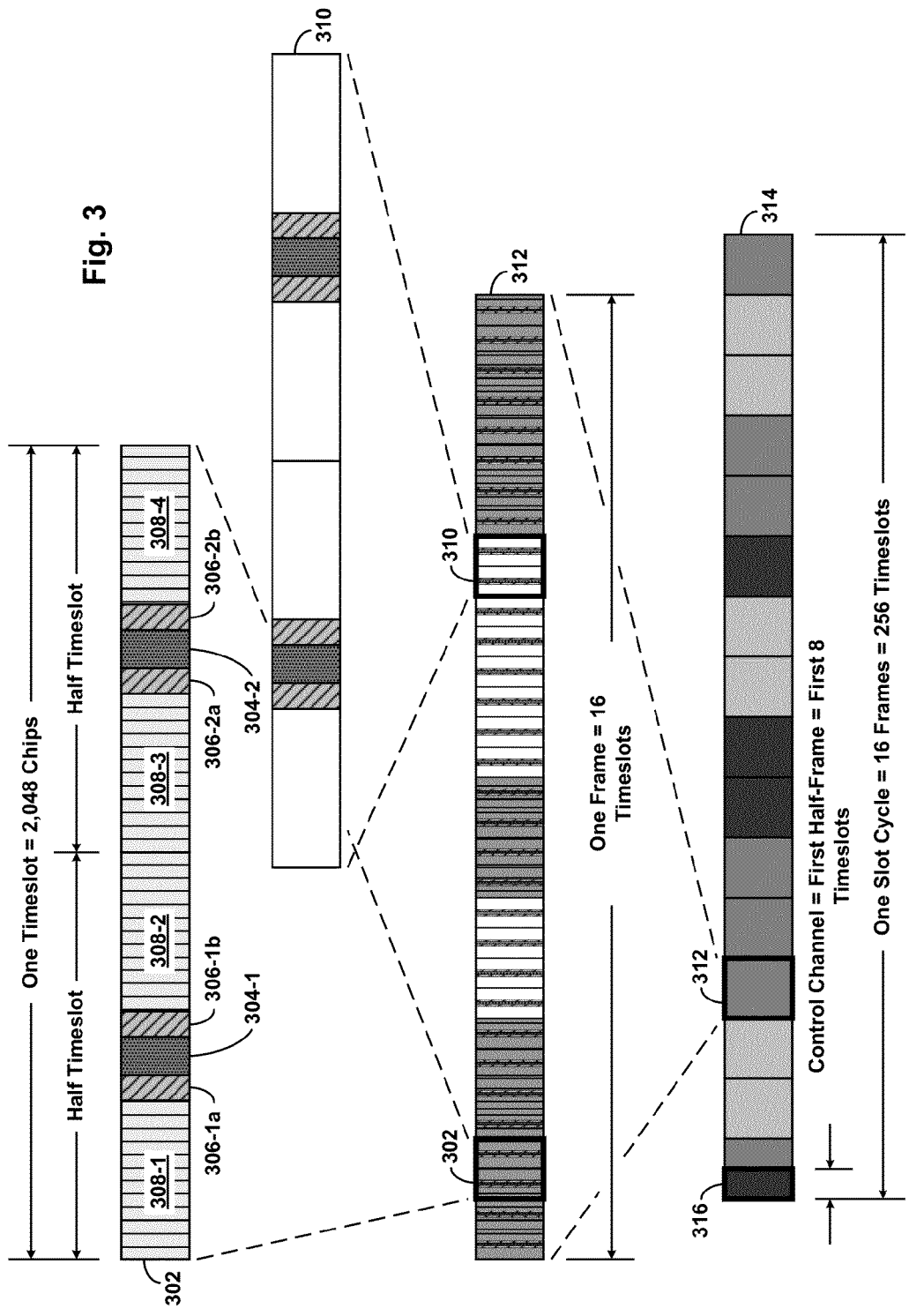
FIG. 3 illustrates the structure of timeslots for both the idle and non-idle cases, and further illustrates the organizational relationship between timeslots, frames, and slot cycles, according to an exemplary embodiment.

FIG. 3 illustrates the structure of EVDO timeslots for both the idle and non-idle cases, and further illustrates the organizational relationship between timeslots, frames, and slot cycles. A non-idle timeslot 302 is shown at the top of the figure. As indicated, the timeslot 302 has 2,048 chips spanning two half timeslots of 1,024 chips each. Each half timeslot has a 96-chip pilot burst at its center, labeled 304-1 and 304-2, and a MAC channel sandwiching the pilot burst in two 64-bit segments (306-1a and 306-1b on either side of pilot burst 304-1, and 306-2a and 306-2b on either side of pilot burst 304-2). After accounting for the pilot burst and the two MAC channel segments, each half timeslot has two 400-chip segments remaining for control-channel or traffic-channel data. These are labeled 308-1 and 308-2 in the first half timeslot, and 308-3 and 308-4 in the second half timeslot.

Under IS-856, the pilot burst encodes a data symbol of zero, covered with the PN offset of the transmitting sector. The MAC channel carries sub-channels (Reverse Activity, Reverse Power Control, and DRCLock) for controlling AT power and rate on the AT's reverse channel to the sector. The MAC sub-channels are code-division multiplexed within the single MAC channel. All of the 1,600 data chips of a given timeslot are either dedicated for traffic-channel data for specific user (i.e., the specific user's AT), or for control-channel data, such as pages and system control messages.

FIG. 3 also depicts an idle timeslot 310. As shown, the idle timeslot also has two half timeslots, each with a pilot burst and two sandwiching MAC channels segments. In the case of an idle slot, however, the data chips are "empty." The sector does still broadcast its pilot burst and MAC channel during an idle timeslot. Further, since the sector has no traffic data to transmit during an idle timeslot, a Data Only Module (DOM) may reduce the transmission power (e.g., by 20 dB) for the transmission data chips in an effort to reduce interference to other neighboring sectors. However, during the same timeslot 310, the DOM may not reduce the transmission power level for the pilot burst and two sandwiching MAC channels segments.

Transmissions are further organized in frames, each containing 16 timeslots, as illustrated by frame 312 in FIG. 3. By way of example, non-idle timeslot 302 and idle timeslot 310 are both included in the frame 312; the dashed lines from each of timeslots 302 and 310 indicate their relative positions within the frame. As also illustrated, there may be a mix of non-idle and idle timeslots in a frame.

As further illustrated in FIG. 3, transmissions are still further organized in 16-frame slot cycles, depicted as slot cycle 314 in the figure. By way of example, frame 312 is included in the slot cycle 314; the dashed lines from the frame 312 indicate is relative position within the slot cycle. Under IS-856, the eight timeslots of the first half-frame of a slot cycle are reserved for control-channel data. The remaining 15½ frames are available for traffic-channel data to one or more users (i.e., one or more ATs). For purposes of illustrations, the frames in the slot cycle 314 are depicted in different shades are gray in order to represent different timeslot utilizations in each frame. Note that timeslot utilization could also be computed across the 16 frames of a slot cycle; and again other time windows could be used.

Under IS-856, an access terminal determines SINR of its serving sector from the pilot bursts of its serving sector and those of other nearby sectors (e.g., in the AT's active set and/or its neighbor list). The power level of the pilot signal of a given sector is usually specified as a gain level, x, according to the relation $x dBm = 10 \log_{10}(P/1 mW)$, where P is the power in mW (milliwatts). However, other power units could be specified. Measured in dBm, gain expresses a logarithmic ratio of power P to a fixed power level of 1 mW. As a relative level, SINR of the given sector is then expressed in dB. For example, SINR=+3 dB would correspond to a pilot channel power twice that of the noise and interference from other detectable pilot signals. Similarly, SINR=+6 dB would correspond to a pilot channel power four times that of the noise and interference from other detectable pilot signals.

Further, an AT may determine a forward-link data rate to request from its serving sector based on the determined SINR. In practice, AT can maintain a table or other data structure that contains a correlation of preconfigured SINR threshold values with corresponding preconfigured forward-link data rates. For a given measured SINR, the AT can perform a table look-up to determine a forward-link data rate. Each preconfigured forward-link data rate is represented in the table by a DRC code or symbol, rather than by an actual numerical data rate. The AT may then transmit the determined DRC code to its serving sector in a DRC request message.

Under IS-856, the serving base station may apply a DRC offset to a DRC request received from an AT in order to help compensate for a possible over-estimation by the AT of its attainable forward-link data rate. The DRC offset is applied as a reduction to the AT's DRC request, causing the base station to use a lower forward-link data rate than that requested by the AT. In turn, the AT may be able to more reliably decode its forward-link data from the base station. In practice, the base station maintains a table of DRC offsets, and determines which to apply in any given instance. After determining a data rate for an AT, the serving base station may respond to the DRC request message by transmitting data on the forward link to the AT at the determined rate.

Figure 4:
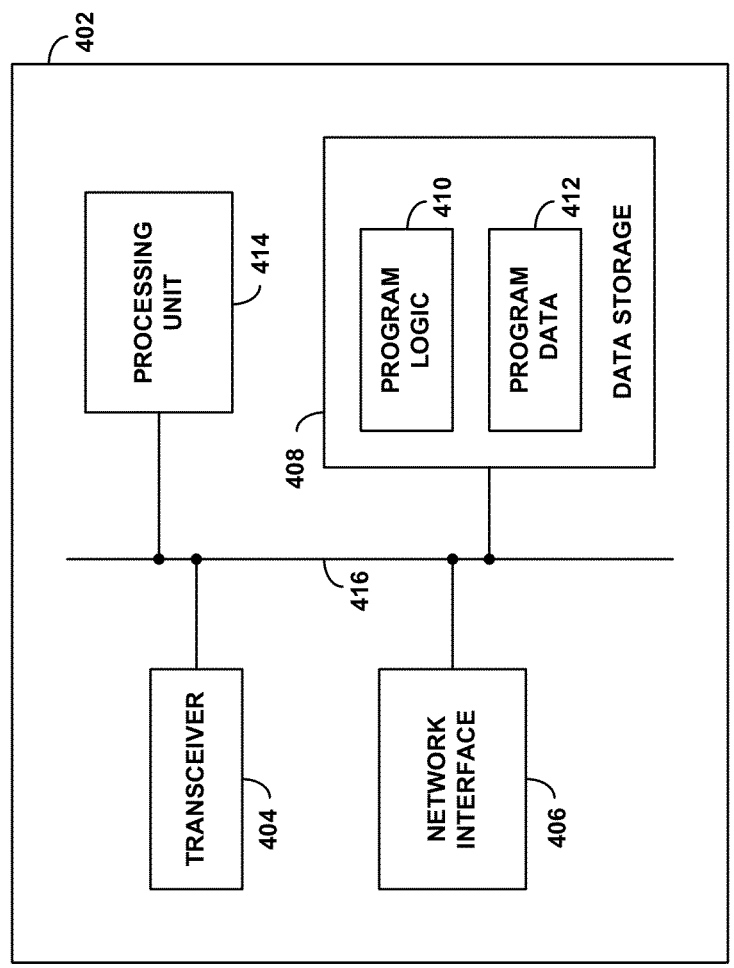
FIG. 4 is a simplified block diagram depicting functional components of an exemplary base station.

FIG. 4 is a simplified block diagram depicting functional components of an example base station 402, which may be operable for the exemplary base-station functions described herein. As shown in FIG. 4, the example base station 402, representative of BTS 106 or BSC 108 integrated with BTS 106 in FIG. 1, for instance, includes a transceiver 404, network interface 406, a processing unit 414, and data storage 408, all of which may be coupled together by a system bus 416 or other mechanism. In addition, the base station may also include external storage, such as magnetic or optical disk storage, although this is not shown in FIG. 4.

These components may be arranged to support conventional operation in a wireless communication network that is compliant with a CDMA family of protocols, such as network 100 illustrated in FIG. 1. The details of such an arrangement and how these components function to provide conventional operation are well-known in the art, and are not described further herein. Certain aspects of base station 402 relevant to dynamic adaptation of synchronized determination of rate control are discussed briefly below.

Network interface 406 enables communication on a network, such network 100. As such, network interface 406 may take the form of trunk or optical link that can be coupled with a TDM switch such as MSC 40, or an Ethernet network interface card or other physical connection that can be coupled with PCF 46, for instance. Further, network interface 406 in combination with transceiver 404, which may include one or more BTS antennas, enables air interface communication with one or more access terminals, supporting forward-link transmissions of protocol version messages, among other message and commands, and supporting reception reverse-link traffic on reverse links.

Processing unit 414 may include one or more general-purpose processors (e.g., INTEL microprocessors) and/or one or more special-purpose processors (e.g., dedicated digital signal processor, application specific integrated circuit, etc.). In turn, the data storage 408 may include one or more volatile and/or non-volatile storage components, such as magnetic or optical memory or disk storage. Data storage 408 may be integrated in whole or in part with processing unit 414, as cache memory or registers for instance. As further shown, data storage 408 is equipped to hold program logic 410 and program data 412.

Program logic 410 may comprise machine language instructions that define routines executable by processing unit 414 to carry out various functions described herein. In particular the program logic, communication interface, and transceiver may operate cooperatively to carry out logical operation such as that discussed below in FIG. 5 and/or FIG. 6.

II. Exemplary Methods

A. Data Rate Adjustment Based on Power Variance in Neighbor Sector

Figure 5:
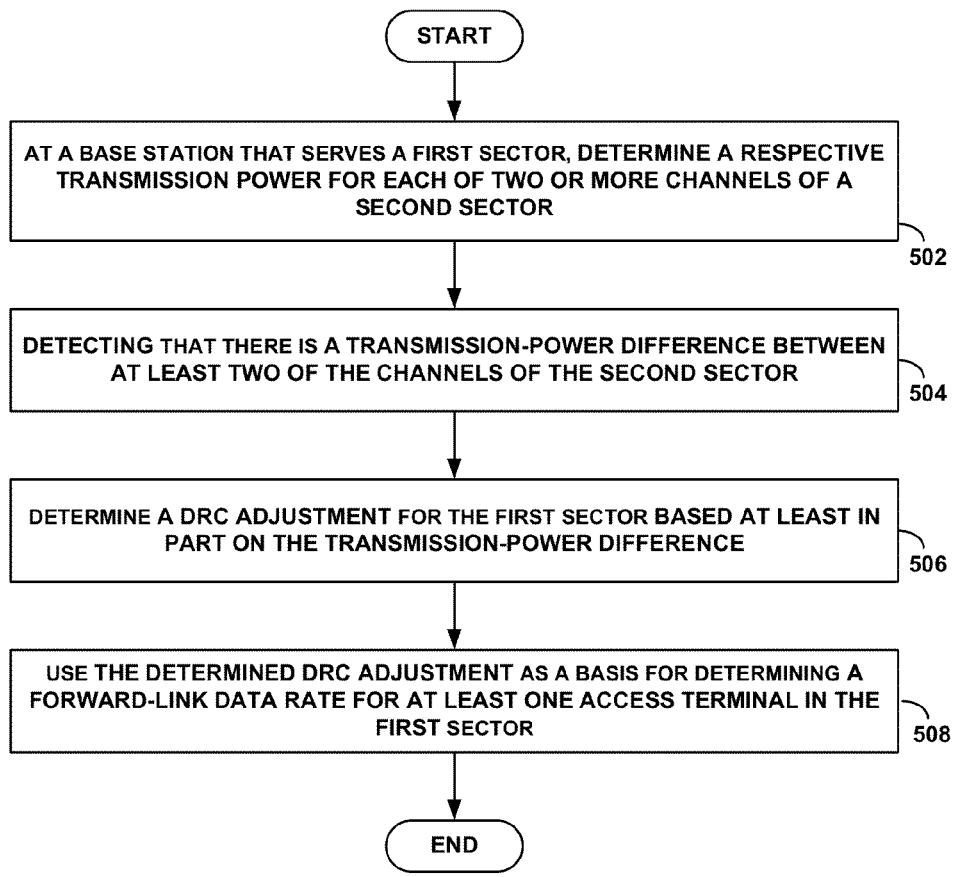
FIG. 5 is a flowchart illustrating a method, according to an exemplary embodiment.

FIG. 5 is a flowchart illustrating a method 500, according to an exemplary embodiment. Method 500 is described by way of example as being carried out by a base station that serves a first sector, which may implement method 500 to adjust the forward-link data rate for access terminals in the first sector according to transmission-power variations in one or more neighbor sectors. However, method 500 and other methods described herein may be carried out by other RAN components, or combinations of such RAN components, for the same or different purposes, without departing from the scope of the invention.

At block 502, method 500 involves the base station that serves a first sector determining a respective transmission power for each of two or more channels of a second sector. The base station may then detecting that there is a transmission-power difference between at least two of the channels of the second sector, as shown by block 504. In response to detecting the transmission-power difference, the base station may determine a DRC adjustment for the first sector based at least in part on the transmission-power difference, as shown by block 506. The base station may then use the determined DRC adjustment as a basis for determining a forward-link data rate for at least one access terminal in the first sector, as shown by block 508.

In an example embodiment, the second sector is a neighbor sector of the first sector. That is, the first and second sectors are adjacent to one another. In some embodiments, the first sector may have two or more neighbor sectors, and the serving base station may determine a transmission-power difference in each of two or more neighbor sectors. The base station may then determine a DRC adjustment if any one of the neighbor sectors has a transmission-power difference. Additionally, the serving base station could vary the amount of the DRC adjustment based on the transmission-power differences that exist in a number of neighbor sectors. For example, the base station could increase the DRC adjustment as the number of neighbor sectors with a threshold transmission-power difference increases. As another example, the base station could determine a cumulative transmission-power difference for all neighbor sectors, and base the DRC adjustment on the cumulative transmission-power difference. Other examples are also possible.

When sectors are served by different base stations, the base station or a switch serving a given sector may use various techniques to determine the transmission power levels for channels in a neighbor sector and/or to determine the transmission-power difference in a neighbor sector. For example, the switch (e.g., the RNC or BSC) serving a given sector may keep a neighbor list for the sector, which indicates the neighbor sectors of the given sector. The switch may communicate with the base station or stations that serve the sectors in the neighbor list (possibly via another switch or switches that serve the base station or stations that serve the neighbor sectors) to determine a transmission-power difference in each of the neighbor sectors. The neighbor list for a given sector may then be updated to indicate the respective transmission-power difference (if any) in each neighbor sector.

In an exemplary embodiment, a transmission-power difference may occur in a second sector that is a neighbor to a first sector, as the result of any variance in transmission power in the neighbor sector that might cause an AT to over- or under-estimate the extent to which transmissions in the second sector interfere with transmissions from the first sector. For example, the transmission-power difference in a given sector, such as that determined at block 504, may be the difference (if any) between the transmission power of the data channel and one or more of: (a) the transmission power of the MAC channel and (b) the transmission power of the pilot channel.

To illustrate, consider a base station that is configured to use the same default transmission power for data-channel transmissions, MAC-channel transmissions, and pilot-channel transmissions in a given sector. Further, consider that the base station is configured to reduce the transmission power for data channels in the sector when there is no data, while maintaining the transmission power for both the MAC channel and the pilot channel (or adjusting the power of the MAC and pilot channel transmissions in the same manner, but differently from data transmissions). In this scenario, a transmission-power difference will exist in the sector when the base station reduces the transmission power for the data channels, but maintains the higher default transmission power for MAC and pilot channel transmissions. For instance, the transmission-power difference may be calculated by subtracting the default transmission power, which is used for MAC and pilot channel transmissions, from the reduced transmission power used for data-channel transmissions.

In an exemplary embodiment, the DRC adjustment determined at block 506 may be a DRC offset. Further, the particular manner in which the transmission-power difference in a neighbor sector is used to determine the DRC offset may vary depending upon the particular implementation. For instance, in an exemplary embodiment, if the transmission power for MAC and/or pilot transmissions in a neighbor sector is greater than the transmission power for data in the neighbor sector, ATs in the adjacent sector that calculate C/I or SINR during the neighbor sector's pilot transmission will likely over-estimate interference from the neighbor sector and thus under-estimate C/I or SINR in the adjacent sector. Accordingly, the base station serving the adjacent sector (e.g., the first sector in method 500) may determine a DRC offset so as to increase the data rate for such ATs. For example, the base station may apply a negative DRC offset that effectively increases the data rate that is provided to an AT in the adjacent sector, from the data rate that is requested by the AT in its DRC request.

On the other hand, if the transmission power for MAC and/or pilot transmissions in a neighbor sector is less than the transmission power for data in the neighbor sector, ATs in the adjacent sector will likely under-estimate interference from the neighbor sector, and therefore over-estimate C/I or SINR in the adjacent sector. Accordingly, the base station serving the adjacent sector may determine a DRC offset so as to decrease the data rate provided for such ATs. For example, the base station may apply a positive DRC offset that effectively increases the data rate that is provided to an AT in the adjacent sector, from the data rate that is requested by the AT in its DRC request. In either of the above cases, the amount of the DRC offset may generally be proportional to the size of the transmission-power difference, so as to compensate for the over- or under-estimation of C/I or SINR that is expected to occur as a result of the difference.

In a further aspect, a base station may condition the performance of block 508 on a determination that a particular AT in the first sector is at a location where it is likely to experience interference from the second sector. For example, various techniques may be used to determine an interference range of a given sectors transmissions, such that ATs within the interference range are expected to experience interference from the sector's transmissions with transmissions from another sector. Accordingly, when a base station receives a DRC request from a given AT in the first sector, the base station may determine whether the AT is within interference range of the second sector (and possibly the interference ranges of other neighbor sectors, in the event the first sector has other neighbor sectors). If the AT is within interference range of the second sector, then the base station may perform block 508 in order to adjust the forward-link data rate that was requested by the AT. However, if the AT is not within interference range of any neighbor sectors, then the AT may refrain from adjusting the requested data rate (and thus may grant the DRC request from the AT without applying a DRC offset).

Figure 6:
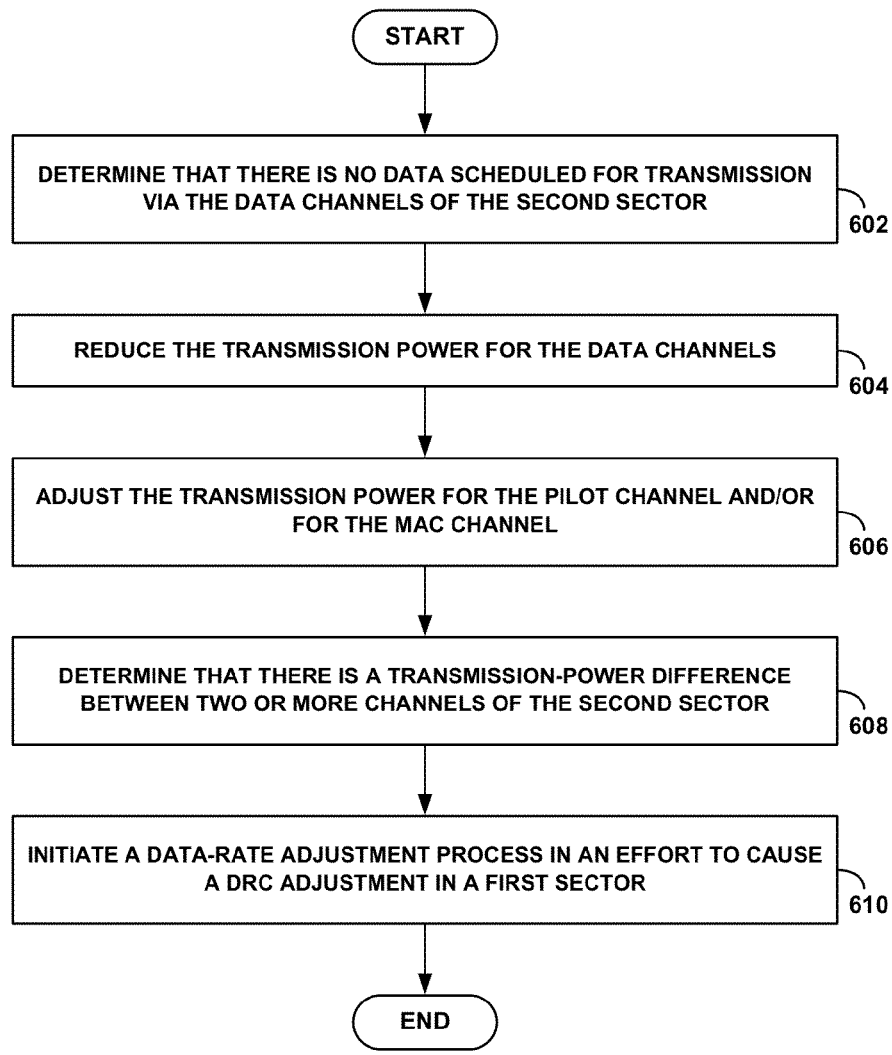
FIG. 6 is another flowchart illustrating a method, according to an exemplary embodiment.

An additional embodiment may involve a base station, which serves a given sector (e.g., the neighbor sector referred to in the description of FIG. 5), implementing a method to help facilitate a DRC adjustment for an adjacent sector. For example, FIG. 6 is another flowchart illustrating a method 600, according to an exemplary embodiment. Method 600 may be carried out by a base station that serves second sector (e.g., the second or neighbor sector described in method 500) to vary transmission power of two or more channels, and to facilitate corresponding data rate adjustments in a first sector (e.g., an adjacent sector).

More specifically, method 600 involves the base station determining that there is no data scheduled for transmission via the data channels of the second sector, as shown by block 602. In response, the base station may adjust the respective transmission power for various channels. More particularly, the base station may reduce the transmission power for the data channels, as shown by block 604. Further, the base station may adjust the transmission power for the pilot channel and/or for the MAC channel, as shown by block 606. Alternatively, the base station might only adjust the transmission power for the data channels. In either case, after making transmission-power adjustments, a transmission-power difference may exist between the data channel and at least one of the medium access control channel and the pilot channel. Accordingly, the base station may determine that there is a transmission-power difference between two or more channels of the second sector, as shown by block 608.

In response to detecting the transmission-power difference at block 608, the base station may initiate a data-rate adjustment process in an effort to cause a DRC adjustment in a first sector, as shown by block 610. Further, in an exemplary embodiment, the data-rate adjustment process may be such that the DRC adjustment is based at least in part on the transmission-power difference between the two or more channels of the second sector.

In some cases, method 600 may be carried out by a base station that provides service in both the first and second sector (e.g., by a base station that serves two or more adjacent sectors). In such case, the data-rate adjustment process at block 610 may involve the base station determining a DRC adjustment for the first sector based at least in part on the transmission-power difference between the two or more channels of the second sector. The base station may then apply the DRC adjustment to DRC requests from ATs in the first sector in order to determine the forward-link data rates for the access terminals.

In other cases, the first sector and the second sector may be served by different base stations. For example, method 600 may be carried out by a second base station that serves the second sector, while the first sector is served by a first base station (which may or may not be involved in carrying out the method). In such case, the data-rate adjustment process may involve the second base station sending a message to the first base station, which indicates the transmission-power difference between two or more channels of the second sector.

Further, the message may take the form of an explicit instruction to the first base station, which indicates that the first base station should: (a) determine the DRC adjustment for the first sector based at least in part on the indicated transmission-power difference and (b) apply the DRC adjustment when determining the forward-link data rate for at least one access terminal in the first sector. In such an embodiment, the first base station may comply with the instruction by using the indicated transmission-power difference to determine and apply a DRC adjustment. For instance, the first base station may use the indicated transmission-power difference to implement a method such as that illustrated in FIG. 5.

In a further aspect, various functions of the second base station may be shifted to the first base station, and vice versa. For example, rather than sending an instruction to determine a DRC adjustment, the second base station may itself determine the DRC adjustment. As such, the data-rate adjustment process at block 610 may involve the second base station determining the DRC adjustment for the first sector based at least in part on the transmission-power difference, and then sending a message to the first base station that indicates the DRC adjustment for the first sector.

Referring again to block 606, in an exemplary embodiment, the base station may optionally adjust the transmission power for the pilot channel and/or the MAC channel. Further, various techniques may be used to adjust the transmission power for the pilot channel and/or the MAC channel, depending upon the particular implementation. Yet further, the transmission power for the pilot channel and/or the MAC channel may be increased or reduced, depending upon the particular technique and/or the particular scenario to which the technique is applied.

Figure 7:
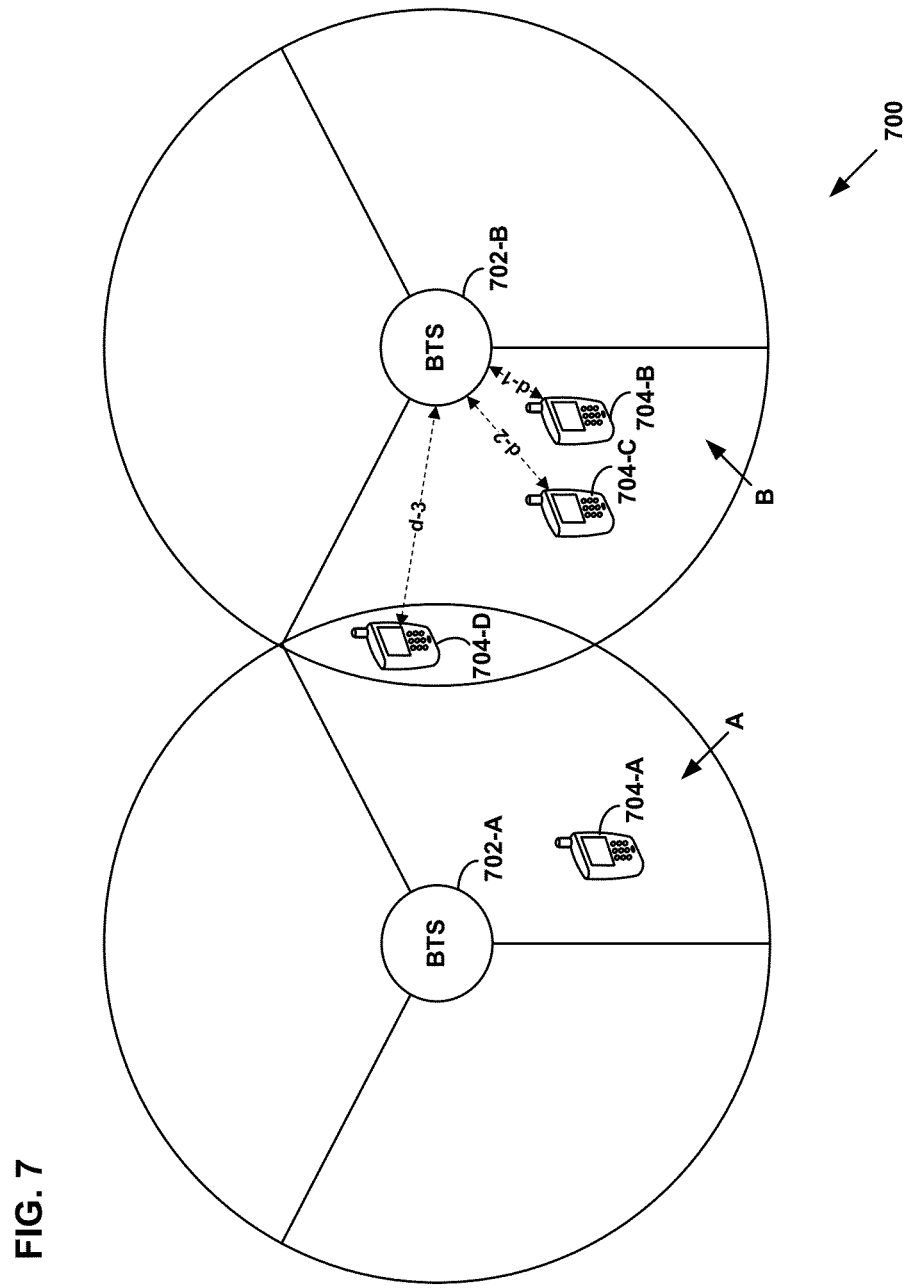
FIG. 7 illustrates a scenario in which an exemplary method may be implemented, according to an exemplary embodiment.

In some embodiments, a base station may adjust the transmission power for the pilot channel and/or the MAC channel based on the distance or distances between the base station and ATs that include the base station in their respective active sets. For example, FIG. 7 illustrates a scenario 700 in which block 606 (and possibly the rest of method 600) may be implemented, according to an exemplary embodiment.

More specifically, in scenario 700, a first base station 702-A is serving sector A, and a second base station 702-B is serving sector B. Further, AT 704-A is located in sector A, ATs 704-B and 704-C are located in sector B, and AT 704-D is at a location where sectors A and B overlap. Further, each AT 704-B, 704-C, and 704-D may be located such that the pilot signal for sector B is strong enough that the AT is either connected via sector B or includes sector B in its active set and/or in its route update message.

At the illustrated point in time, base station 702-B may determine that it has no data to send to any of the ATs. In response, base station 702-B may determine the respective distance between it and one or more of access terminals 704-B, 704-C, and 704-D. Base station 702-B may then adjust the transmission power of at least one of the medium access control channel and the pilot channel in sector B, based on the determined distance or distances.

For example, base station 702-B may determine that the distances to 704-B, 704-C, and 704-D, are distance d-1, distance d-2, and distance d-3, respectively. In an exemplary embodiment, a base station may use various techniques to determine which ATs should be evaluated and/or to determine the respective distance to each such AT. For example, a base station may include ATs that have sent a route update message that includes a sector served by the base station (e.g., the sector in which a transmission-power difference is detected). The base station may then determine the location of these ATs using GPS-based and/or a triangulation-based location techniques, for example. Then, knowing its own location, a base station may determine the distance between its location and the location of each AT.

Base station 702-B may then determine a furthest distance (which is distance d-3 in scenario 700), or an average distance, and use either the furthest distance or average distance as a basis for determining whether and/or how to adjust the transmission-power of at the MAC and pilot-channel transmissions in sector B. For instance, if the furthest or average distance is less than a predetermined threshold distance, then base station 702-B may reduce the transmission power for the MAC and pilot channels. Further, in some implementations, base station 702-B may vary the amount by which the transmission power is reduced according to how close the ATs are. In particular, the closer the ATs are to the base station, the greater the power reduction for MAC and pilot-channel transmissions.

Further, if the furthest or average distance is greater than the predetermined threshold distance, then the base station 702-B may refrain from adjusting the transmission power for the MAC and pilot channel. Alternatively, when ATs are further away from base station 702-B, base station 702-B might increase the power of MAC- and/or pilot-channel transmissions.

Note that the transmission-power difference between the data channel and the MAC and pilot channels in sector B may vary, depending on the particular transmission-power adjustments that are made for the data channels and/or for the MAC and pilot channels. Further, since the corresponding DRC adjustment in sector A may be based on the transmission-power difference in sector B, the DRC adjustment for sector A may also vary according to the particular transmission-power adjustments that are made in sector B.

For example, consider an instance where base station 702-B reduces the transmission power of both the MAC channel and the pilot channel by more than it reduces the transmission power for data channels. As such, the reduced transmission power of the MAC channel and the pilot channel may be less than the reduced transmission power of the data channels. Since AT 704-D may determine C/I or SINR for sector A during the portion of a slot allocated for pilot transmissions, AT 704-D may underestimate the amount of interference from sector B, and thus may over-estimate the C/I or SINR for sector A. Accordingly, base station 702-A may carry out an exemplary method, such as method 500, in order to determine and apply a DRC offset that compensates for possible over-estimation of the C/I or SINR by AT 704-D. Further, base station 702-B may carry out an exemplary method, such as method 600, in order to facilitate help and/or instruct base-station 702-A to apply such a DRC offset.

As another example, consider an instance where base station 702-B reduces the transmission power of both the MAC channel and the pilot channel by a lesser amount than it reduces the transmission power for data channels. As such, the reduced transmission power of the MAC channel and the pilot channel may be greater than the reduced transmission power of the data channels. In this instance, AT 704-D may over-estimate the amount of interference from sector B, and thus may under-estimate the C/I or SINR for sector A. Accordingly, base station 702-A may carry out an exemplary method, such as method 500, in order to determine and apply a DRC offset that compensates for possible under-estimation of the C/I or SINR by AT 704-D. Further, base station 702-B may carry out an exemplary method, such as method 600, in order to facilitate help and/or instruct base-station 702-A to apply such a DRC offset.

III. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A computer-implemented method comprising:

receiving, by a first base station, a message from a second base station that is responsive to detection of a transmission-power difference between two or more channels of a second sector that is served by the second base station, wherein the message indicates the transmission-power difference between the two or more channels of the second sector and comprises an instruction to the first base station to: (a) determine, based at least in part on the transmission-power difference between the two or more channels of the second sector, a data rate control (DRC) adjustment for at least one sector that is served by the first base station, and (b) apply the DRC adjustment to determine a forward-link data rate for at least one access terminal in the at least one sector for which the DRC adjustment is determined;

in response to the instruction to determine the DRC adjustment for at least one sector and apply the DRC adjustment to determine the forward-link data rate, the first base station:

determining, based at least in part on the transmission-power difference, a particular DRC adjustment for a first sector that is served by the first base station; and using, by the first base station, the particular DRC adjustment as a basis for determining a particular forward-link data rate for at least one access terminal in the first sector.

2. The method of claim 1, wherein the second sector is a neighbor sector of the first sector.

3. The method of claim 1, wherein the transmission-power difference between the two or more channels of the second sector comprises a difference between a transmission power of a data channel of the second sector and one or more of: (a) a transmission power of a medium access control channel of the second sector and (b) a transmission power of a pilot channel of the second sector.

4. The method of claim 3, wherein the transmission power of the medium access control channel of the second sector is equal to the transmission power of the pilot channel of the second sector, and wherein the transmission power of the data channel of the second sector is different from the transmission power of the medium access control channel and the transmission power of the pilot channel.

5. The method of claim 1, wherein the DRC adjustment comprises a DRC offset.

6. A non-transitory computer readable medium having stored therein instructions executable by at least one processor to cause a first base station that serves a first sector to perform functions comprising:

receiving a message from a second base station that is responsive to detection of a transmission-power difference between two or more channels of a second sector that is served by the second base station, wherein the message indicates the transmission-power difference between the two or more channels of the second sector and comprises an instruction to the first base station to: (a) determine, based at least in part on the transmission-power difference between the two or more channels of the second sector, a data rate control (DRC) adjustment for at least one sector that is served by the first base station, and (b) apply the DRC adjustment to determine a forward-link data rate for at least one access terminal in the at least one sector for which the DRC adjustment is determined;

in response to the instruction to determine the DRC adjustment for at least one sector and apply the DRC adjustment to determine the forward-link data rate:

determining, based at least in part on the transmission-power difference, a particular DRC adjustment for a first sector that is served by the first base station; and using the particular DRC adjustment as a basis for determining a particular forward-link data rate for at least one access terminal in the first sector.

7. The non-transitory computer readable medium of claim 6, wherein the second sector is a neighbor sector of the first sector.

8. The non-transitory computer readable medium of claim 6, wherein the transmission-power difference between the two or more channels of the second sector comprises a difference between a transmission power of a data channel of the second sector and one or more of: (a) a transmission power of a medium access control channel of the second sector and (b) a transmission power of a pilot channel of the second sector.

9. The non-transitory computer readable medium of claim 8, wherein the transmission power of the medium access control channel of the second sector is equal to the transmission power of the pilot channel of the second sector, and wherein the transmission power of the data channel of the second sector is different from the transmission power of the medium access control channel and the transmission power of the pilot channel.

10. The non-transitory computer readable medium of claim 6, wherein the DRC adjustment comprises a DRC offset.

11. A computer-implemented method comprising:

determining, by a second base station that serves a second sector, that there is a transmission-power difference between two or more channels of the second sector; and in response to determining that there is the transmission-power difference between two or more channels of the second sector, the second base station initiating a data-rate adjustment process in an effort to cause a data rate control (DRC) adjustment in a first sector that is served by a first base station, wherein initiating the data-rate adjustment process comprises sending, by the second base station, a message to the first base station, wherein the message indicates the determined transmission-power difference between two or more channels of the second sector and comprises an instruction to the first base station to: (a) determine the DRC adjustment for the first sector based at least in part on the determined transmission-power difference between the two or more channels and (b) apply the DRC adjustment when determining a forward-link data rate for at least one access terminal in the first sector.

12. The method of claim 11, wherein the data-rate adjustment process comprises:

the second base station determining the DRC adjustment for the first sector based at least in part on the transmission-power difference; and the second base station sending a message to the first base station, wherein the message indicates the DRC adjustment.

13. The method of claim 11, wherein the two or more channels of the second sector comprise a data channel and at least one of: (a) a medium access control channel and (b) a pilot channel, and wherein the method further comprises:

at least one of the first base station and the second base station determining that there is no data scheduled for transmission via the data channel of the second sector; and in response to determining that there is no data scheduled for transmission via the data channel, at least one of the first base station and the second base station reducing a transmission power of the data channel such that the transmission-power difference exists between the data channel and at least one of the medium access control channel and the pilot channel.

14. The method of claim 13, further comprising:
the first base station determining a distance between the first base station and each of one or more access terminals;
in further response to determining that there is no data scheduled for transmission via the data channel, making an adjustment to a transmission power of at least one of the medium access control channel and the pilot channel, wherein the adjustment is based on the distances between the first base station and the one or more access terminals.

15. The method of claim 14, wherein the adjustment to the transmission power of at least one of the medium access control channel and the pilot channel is such that the transmission power of at least one of the medium access control channel and the pilot channel is less than the reduced transmission power of the data channel.

16. The method of claim 14, wherein the adjustment to the transmission power of at least one of the medium access control channel and the pilot channel comprises a transmission-power reduction such that the reduced transmission power of at least one of the medium access control channel and the pilot channel is greater than the reduced transmission power of the data channel.

17. The method of claim 14, wherein the adjustment to the transmission power of at least one of the medium access control channel and the pilot channel comprises a transmission-power increase.

* * * * *